United States Patent [19]

Howells et al.

[11] 4,220,816

[45] Sep. 2, 1980

[54] DIGITAL DUPLEX TRANSMISSION SYSTEM

[75] Inventors: George A. Howells, Bishop's Stortford; James A. Murray, Sawbridgeworth; Douglas E. Woodman, Harlow, all of England

[73] Assignee: International Standard Electric Corporation, New York, N.Y.

[21] Appl. No.: 2,493

[22] Filed: Jan. 11, 1979

[30] Foreign Application Priority Data

Jan. 17, 1978 [GB] United Kingdom ............... 01789/78

[51] Int. Cl.² .............................................. H04J 3/06
[52] U.S. Cl. ........................................ 370/24; 375/28
[58] Field of Search .................... 178/58 R, 58 A, 59, 178/60, 68; 179/15 BS, 15 BA; 325/38 R, 38 A, 38 B

[56] References Cited

U.S. PATENT DOCUMENTS

| 3,936,602 | 2/1976 | Korver | 178/58 R |
| 4,071,692 | 1/1978 | Weir et al. | 325/38 A |

Primary Examiner—Thomas A. Robinson
Attorney, Agent, or Firm—John T. O'Halloran; Alfred C. Hill

[57] ABSTRACT

A digital duplex transmission system for use in a local area uses a modified dipulse code from the exchange terminal to the subscriber terminal and either a different modified dipulse code or a modified AMI (Alternate Mark Inversion) code in the other direction to achieve time separation of signals at each terminal. Incorporation of a hybrid separator in each terminal further improves the performance of the system.

9 Claims, 7 Drawing Figures

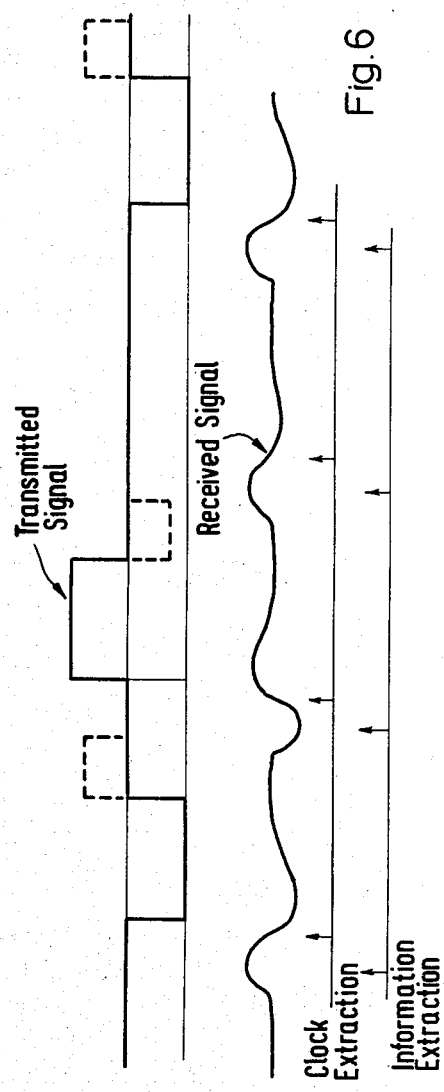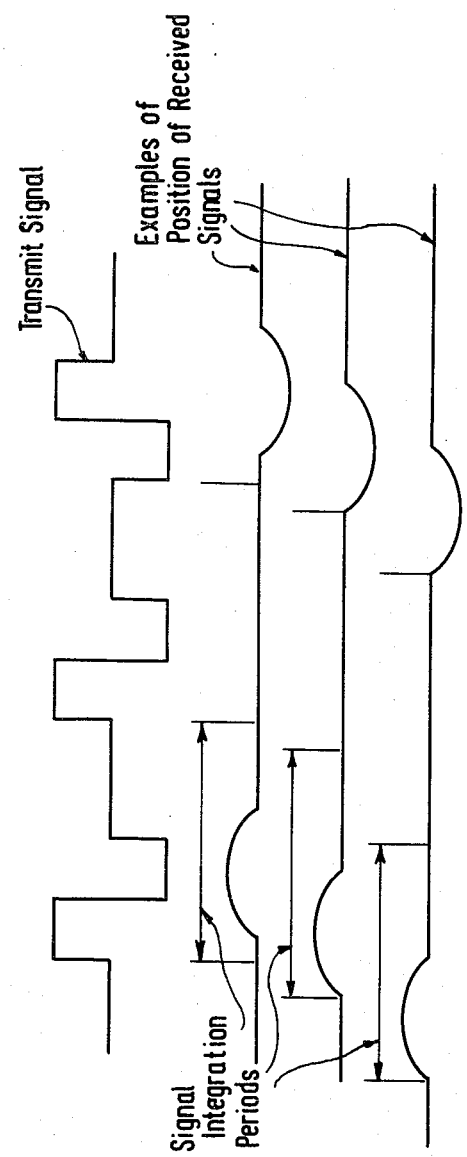

4,220,816

DIGITAL DUPLEX TRANSMISSION SYSTEM

BACKGROUND OF THE INVENTION

This invention relates to a digital duplex transmission system, such as may be used in a telephone local exchange area.

A recent development in telephony is the employment of digital transmission of signals between subscribers and the exchange in the local area using pulse code modulation techniques. Such systems can employ traditional terminating sets to realize bi-directional transmission over a single pair of wires connecting the exchange and the subscriber's set, hereinafter both referred to as terminals. However, the performance of systems using terminating sets for separation of digital signals is governed by the degree to which the interconnecting 2-wire transmission line can be matched. This is a disadvantage when a standard subscriber's terminal with a fixed matching impedance is required to be used for a range of line characteristics.

Another technique that can be employed to realize bi-directional transmission is time separation. This technique inherently implies the use of shorter duration signals per bit of information communicated. The necessary transmission period is governed by both the number of bits in the time separated blocks and the distance between the terminals. The number of bits in a block is in turn governed by the information transmission delay which it introduces and the need for storage.

SUMMARY OF THE INVENTION

An object of the present invention is to provide a digital duplex transmission system which is more tolerant to line impedance variations than that provided by simple terminating set separation, but which requires a lower frequency band than the established time separation method and does not have the disadvantages of block methods of operation.

A feature of the present invention is the provision of a digital duplex transmission system comprising: two terminals interconnected by a 2-wire transmissin line; first means disposed in one of the terminals coupled to the line for transmitting isochronous digital signals as pulse encoded signals of one type having a duty factor not exceeding 50% over the line; second means disposed in the other of the terminals coupled to the line for transmitting isochronous digital signals as pulse encoded signals of a different type having a duty factor not exceeding 50% over the line; the one type of encoded signals and the different type of encoded signals having the same digit repetition rate; third means disposed in the one of the terminals coupled to the line to receive the different type of encoded signals from the line; and fourth means disposed in the other of the terminals coupled to the line to receive the one type of encoded signals from the line; the timing of one of the one type of encoded signals and the different type of encoded signal transmitted from one of the one of the terminals and the other of the terminals having a predetermined fixed relationship with the other of the one type of encoded signals and the different type of encoded signals received at the one of the one of the terminals and the other of the terminals such that the periods of zero signal in the one of the one type of encoded signals and the different type of encoded signals coincide with the significant portions of the other of one type of encoded signals and the different type of encoded signals.

BRIEF DESCRIPTION OF THE DRAWING

Above-mentioned and other features and objects of this invention will become more apparent by reference to the following description taken in conjunction with the accompanying drawing, in which:

FIg. 6 illustrates a timing relationship between transmitted AMI signals and received dipulse signals at a subscriber's terminal; and FIG. 7 illustrates a number of different possible timing relationships between transmitted dipulse signals and received AMI signals at an exchange terminal.

DESCRIPTION OF THE PREFERRED EMBODIMENTS

Figure 1:
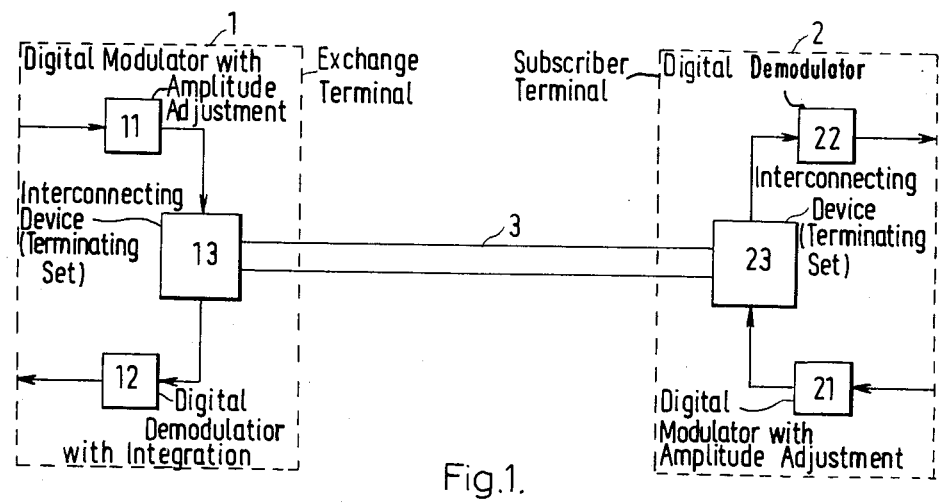
FIG. 1 illustrates a digital duplex transmission system in accordance with the principles of the present invention.

Consider the system shown in FIG. 1 which comprises an exchange terminal 1, a subscriber's terminal 2 and an interconnecting 2-wire transmission link 3. Each terminal is provided with a digital modulator 11 and 21, respectively, a digital demodulator 12 and 22, respectively, and interconnecting devices 13 and 23, respectively, which may be terminating sets for connecting the modulators and demodulators to link 3. Exchange terminal 1 emits a continuous stream of digital signals corresponding to binary "1"'s and "0"'s of a message to be communicated. These signals must contain an adequate clock component so that a synchronized clock can be derived at subscriber terminal 2 for demodulating the incoming signals. It is evident that the same clock can be used for transmission by subscriber's terminal 2 and that, provided the incoming digit signals are suitably spaced, the receive and transmit digit periods can be time separated. In the systems being considered herein, however, the idle time corresponding to the propagation delays in the two directions of the known time separation technique is not included.

The corresponding phasing between the received and transmitted signals at the exchange terminal is arbitrary and is conditioned by the propagation delay. In the absence of an idle period, it is not possible to achieve complete time separation at both terminals. The two embodiments of the invention to be described below have been evolved for dealing with this situation at the exchange terminal. Both embodiments employ the same transmission code in one direction but they use different codes and different decoding principles in the other direction.

In the first embodiment the basis of the operation at the exchange terminal is a combination of terminating set separation and sufficient time separation so that a suitable segment of each received digit signal for decoding is always present outside the significant segment of each transmitted digit signal. Terminating set separation is not fundamental to the decoding operation, which is effectively that of time separation, but provides for a considerable improvement in performance.

Figure 2:
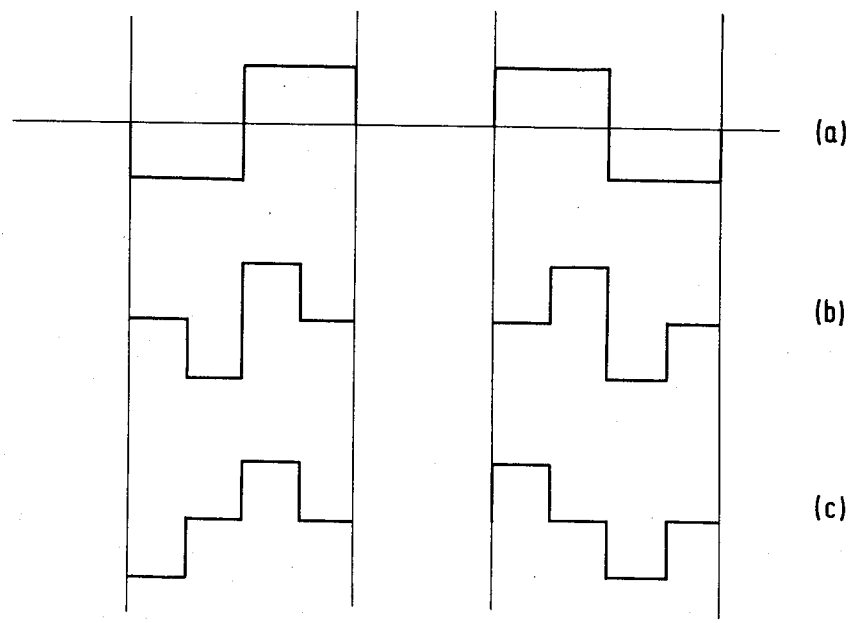
FIG. 2 illustrates basic dipulse code digits and variants thereof having a 50% duty factor.

The first embodiment is implemented by the use of two different variants of the dipulse modulation code for line transmission, one for each direction. The basic dipulse code is illustrated in FIG. 2(a). In the basic dipulse code each digit is represented by a transition from a negative to a positive voltage level, or vice versa, in the center of the digit period. This results in what is termed a balanced line signal if the amplitudes of the voltage levels are equal. In the case of a 100% duty factor code, the relevant voltage levels are each maintained for the complete half digit period. FIG. 2(b) shows a 50% duty factor variant of the basic dipulse code, in which each voltage level is maintained for only one quarter of the digit period. Thus, the first and last quarters of the digit period now provide what might be termed "pseudo idle periods", the significant part of the period being confined to the segment comprising the second and third quarters. FIG. 2(c) shows another 50% duty factor variant of the basic dipulse code, only in this case the voltage levels are now maintained in the first and third quarters while the pseudo-idle time is in the second and fourth quarters. Other 50% duty factor variants of the basic dipulse code can readily be envisaged. Thus, a dipulse encoded signal having a 50% duty factor is defined as a dipulse signal in which for the duration of a digit period the positive and negative voltage levels are each maintained for only one quarter of the total digit period.

Figure 3:
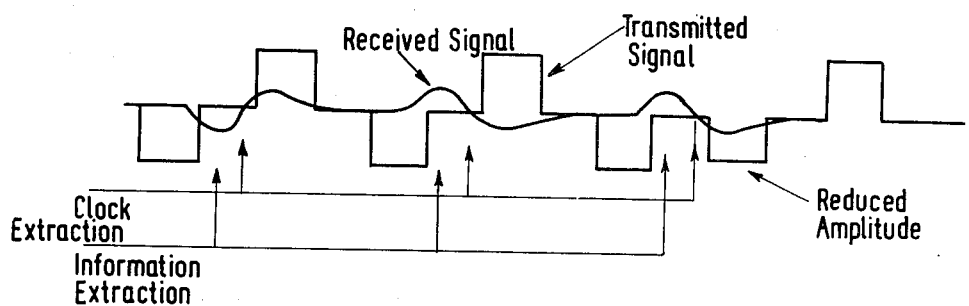
FIG. 3 illustrates a timing relationship between transmitted and received dipulse signals at a subscriber's terminal.

Reverting now to the system of FIG. 1, modulator 11 at the exchange terminal 1 is arranged to transmit one form of 50% duty factor dipulse signal, e.g. the variant shown in FIG. 2(b) while modulator 21 in subscriber's terminal 2 is arranged to transmit another variant, e.g. that shown in FIG. 2(c). At subscriber's terminal 2 a clock is extracted (by means not shown) from the zero crossings of the received signals as shown in FIG. 3. This clock is used to control not only the sampling of the received signals to extract the information in demodulator 22, but also the operation of modulator 21. The arrangement is that at least one of the significant quarters of the transmit signal digit period in modulator 21 coincides with one of the pseudo-idle time quarters of the received signal digit period (depending on the choice of the two 50% duty factor variants employed). FIG. 3 shows the fixed timing relationship between the received and transmitted signals at subscriber's terminal 2. As an alternative to extracting the clock from the transition within the dipulse signal of FIG. 2(b), the clock can be extracted from the front edge of the signal occurring in the second quarter of the digit period. As in the case of exchange terminal 1 separation by use of a terminating set is not fundamental, but does add to the performance of the terminal.

Figure 4:
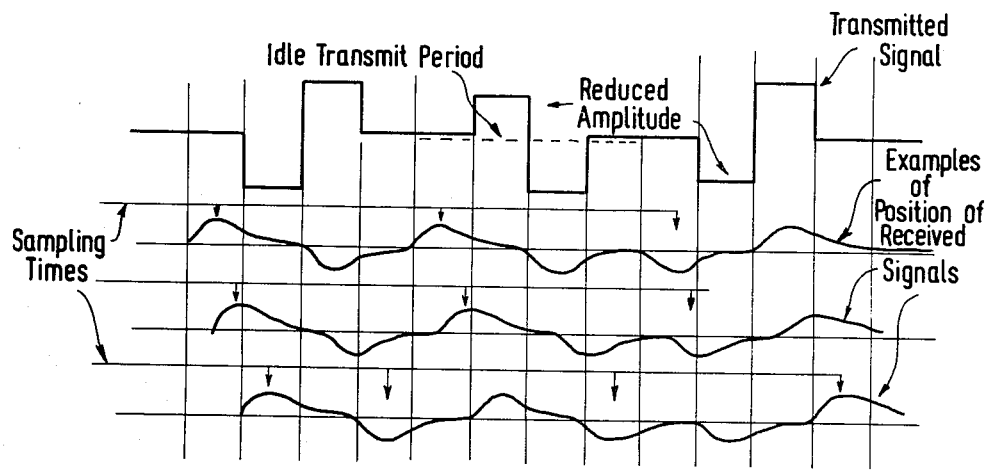
FIG. 4 illustrates a number of different possible timing relationships between transmitted and received dipulse signals at an exchange terminal.

At exchange terminal 1 the decoding clock can be extracted (by means not shown) from the incoming signals. This can be made easier by the deliberate introduction in each direction of an idle transmit period at intervals, which do not coincide with one another. The alternative and preferred method is to use the terminal's master clock for decoding, the appropriate phase being selected as part of a synchronization procedure and/or from the signal received during a pseudo-idle transmit period, as shown in FIG. 4. The shape of the received signals for decoding at each terminal can be improved by modification of the transmitted signals. This is equivalent to some degree of line pre-equalization. One suitable modification is to reduce the amplitude of the line voltage in the second of two successive voltage levels of the same polarity, as shown in FIGS. 3 and 4. By arranging for the amount of the reduction to be made dependent on the line attenuation variation of pre-equalization can be effected as required. Note that consecutive voltage levels of reduced amplitude are of opposite polarity so that a balanced signal waveform is maintained.

Figure 5:
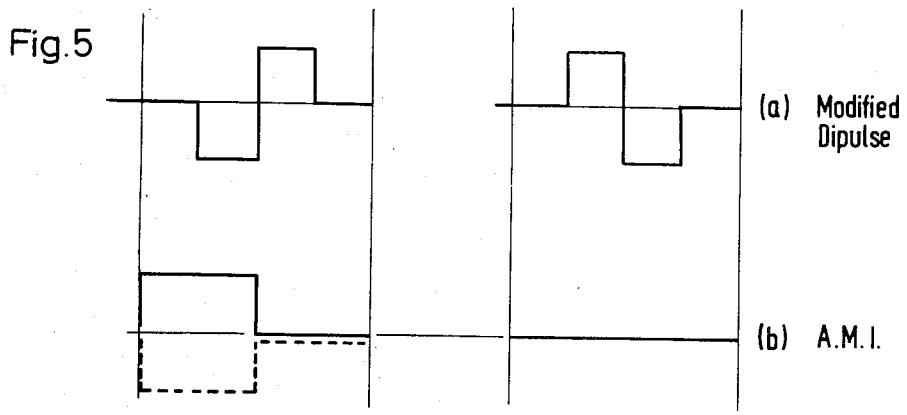
FIG. 5 illustrates 50% duty factor dipulse code digits and corresponding 50% duty factor binary code digits with alternate mark inversion (AMI)

The second embodiment utilizes selection of a suitable balanced transmit signal from exchange terminal 1 with an unbalanced transmit signal (for the duration of a digit period only) from the subscriber's terminal 2, coupled with integration over a digit period or less as a means of decoding to eliminate the unwanted terminating set unbalance. In this case a 50% duty factor dipulse code is transmitted from exchange terminal 1 and a 50% duty factor AMI code variant is transmitted from subscriber's terminal 2. FIG. 5(a) shows an appropriate form of 50% duty factor dipulse code, in which the significant voltage levels are confined to the second and third quarters of the digit period. FIG. 5(b) shows a 50% duty factor AMI code variant. Note that for digits of one binary significance, e.g. binary "0", no voltage level is transmitted for the whole digit period while for digits of the other significance, e.g. binary "1", a positive voltage is normally generated during the first half of the digit period but for alternate "1"'s this is inverted to a negative voltage for transmission. Thus, the 50% duty factor AMI is balanced (over a digit period) only when "0"'s are being transmitted. When "1"'s are transmitted it is an unbalanced signal, although over a number of digit periods the line signals will have an accumulated balanced condition.

FIG. 6 illustrates the signals transmitted by subscriber's terminal 2 and the received signals at terminal 2 and shows the fixed timing relationship between the two. FIG. 7 illustrates the operations at exchange terminal 1 where the phase relationship, i.e. the timing, between the transmitted and received signals is arbitrary. As stated above, the received signal is separated from the terminating set unbalance signal by integration over one digit period. To effect separation it is necessary for the sum of the significant portions of the transmit digit period and the major portion of the signficant received digit signal period to be less than the digit period. Additionally, the significant portions of the transmit signal and the significant portion of the received signal must be contained within the particular digit period used for integration. To effect this it is both necessary and convenient for the integration period to be defined by the start of the transmit digit period, provided the start of the received digit signal occurs within the transmit period. Otherwise it is necessary and convenient for the integration period to be defined by the start of the received digit signal. Typical examples of both cases are shown in FIG. 7.

At subscriber's terminal 2 the clock is extracted by the preferred method from the transition within the received signal. The use of terminating set separation is not fundamental, but provides a greatly improved performance.

At exchange terminal 1 the clock can be derived from the incoming signal provided the AMI code is changed to a High Density Bipolar code (HDB3) to offset the effect of consecutive spaces. Initial synchronization of the integration operation can be effected by inhibiting transmission for a period. An alternative and preferred method is to use the exchange terminal clock and to select an appropriate phase again by a sychronization procedure.

The shape of the received signal at exchange terminal 1 for the purpose of decoding can be improved by modifying the transmit signal from the subscriber's terminal 2, as indicated by the dotted extension to the signal shown in FIG. 6. The amplitude of the complementary pulse can be adjusted to be dependent on the line attenuation as indicated by signal amplitude. The method provides a simple first order pre-equalization for the line necessary to avoid excessive pulse spreading.

Equalization as described in the first embodiment above, for the direction exchange to subscriber is not applicable due to the fact that it would mitigate integration as a means of elimination of interference from the transmit signal.

While reference has only been made to the use of dipulse and/or AMI encoded signals, it is to be noted that other signal formats can be envisaged which can also be utilized, provided that they conform to the 50% duty factor limit. One such signal format is that known as the Top Hat code, in which each digit is represented by a signal level of one polarity which has a duration of half the significant portion of the digit period, i.e. one quarter of the total digit period in a 50% duty cycle code, immediately preceded and followed by levels of the opposite polarity each of half the duration of the level of the one polarity, i.e. one eighth of the total digit period. Conveniently, the duration of the significant signal levels is confined to the center portion of the digit period, i.e. the digit period begins and ends with two portions of zero signal each one quarter of the total digit period.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital duplex transmission system comprising:
   two terminals interconnected by a 2-wire transmission line;
   first means disposed in one of said terminals coupled to said line for transmitting isochronous digital signals as pulse encoded signals of one type having a duty factor not exceeding 50% over said line;
   second means disposed in the other of said terminals coupled to said line for transmitting isochronous digital signals as pulse encoded signals of a different type having a duty factor not exceeding 50% over said line;
   said one type of encoded signals and said different type of encoded signals having the same digit repetition rate;
   third means disposed in said one of said terminals coupled to said line to receive said different type of encoded signals from said line; and
   fourth means disposed in said other of said terminals coupled to said line to receive said one type of encoded signals from said line;
   the timing of one of said one type of encoded signals and said different type of encoded signal transmitted from one of said one of said terminals and said other of said terminals having a predetermined fixed relationship with the other of said one type of encoded signals and said different type of encoded signals received at said one of said one of said terminals and said other of said terminals such that the periods of zero signal in said one of said one type of encoded signals and said different type of encoded signals coincide with the significant portions of said other of said one type of encoded signals and said different type of encoded signals.

2. A system according to claim 1, wherein said one of said one of said terminals and said other of said terminals is said other of said terminals.

3. A system according to claims 1 or 2, wherein said one type of encoded signals are dipulse encoded signals having a given format and said different type of encoded signals are dipulse encoded signals having a format different than said given format.

4. A system according to claims 1 or 2, wherein said one type of encoded signals are dipulse encoded signals, and said different type of encoded signals are simple binary signals in an alternate mark inversion format.

5. A system according to claims 1 or 2, further including
   a first terminating set disposed in said one of said terminals to connect said first and third means to said line; the
   a second terminating set disposed in said other of said terminals to connect said third and fourth means to said line.

6. A system according to claim 5, wherein said third means includes
   fifth means for integrating signals received from said first terminating set over a period of time not greater than the duration of a digit period, said period of time having a predetermined timing relationship with one of said one type of encoded signals transmitted from said one terminal and said different type of encoded signals received by said one terminal.

7. A system according to claims 1 or 2, wherein
   at least one of said one type of encoded signals and said different type of encoded signals are dipulse encoded signals, and
   at least one of said first and second means includes
   fifth means for reducing the amplitude of a first voltage level in said dipulse encoded signals in a digit period when said first voltage level succeeds a second voltage of the same polarity in the immediately preceding digit period.

8. A system according to claims 1 or 2, wherein
   each of said one type of encoded signals and said different type of encoded signals include predetermined psuedo-idle digit periods, said psuedo-idle digit periods contained in said one type of encoded signals being non-coincident with said psuedo-idle digit periods contained in said different type of encoded signals.

9. A system according to claims 1 or 2, wherein said one terminal decodes said different type of encoded signals received from said other terminal under control of a clock signal generated in said one terminal, said clock signal having the same frequency as a master clock signal but having a predetermined phase relationship thereto.

* * * * *